Oct. 16, 1962  L. D. EMRICK  3,058,571
CHAIN FEEDERS
Filed Sept. 9, 1960

INVENTOR.
LLOYD D. EMRICK
BY
Wheeler, Wheeler & Wheeler
ATTORNEYS.

United States Patent Office 3,058,571
Patented Oct. 16, 1962

3,058,571
CHAIN FEEDERS
Lloyd D. Emrick, Fort Atkinson, Wis., assignor to Rockwood & Co., Chicago, Ill., a corporation of Delaware
Filed Sept. 9, 1960, Ser. No. 54,874
5 Claims. (Cl. 198—56)

This invention relates to improvements in chain feeders, particularly of the type used to convey poultry feed through troughs in a poultry house.

The feeder shown herein to exemplify the invention is incorporated in a structure which transfers feed from a return trough to a supply trough. While this is not new per se, the parts are so organized in the device of the present invention that the difference in levels between the incoming return trough and the outgoing supply trough is kept to a minimum. For this purpose the adjacent ends of the respective troughs and the idler sprocket and drive sprocket which guide the chain through the respective troughs are axially offset in a substantially equal amount.

Accordingly, the sprocket for the chain in the outgoing trough is disposed laterally alongside the output end of the incoming trough and does not interfere with relatively close vertical spacing of the two troughs.

Other objects, features and advantages of the invention will appear from the following disclosure in which.

Figure 1:
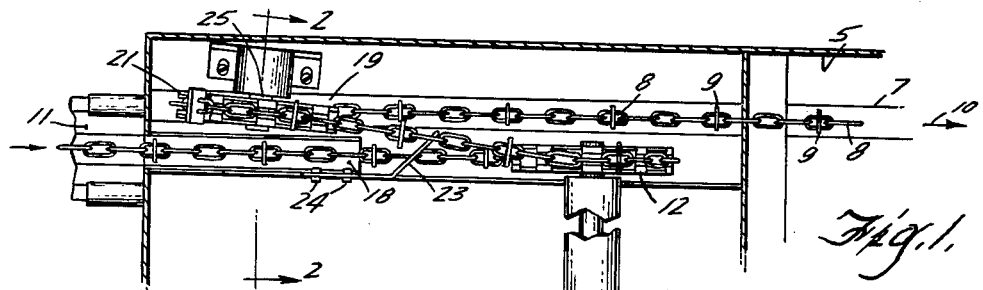
FIG. 1 is a fragmentary horizontal section taken through a chain feed drive embodying the present invention and substantially along the line 1—1 of FIG. 3.

For purposes of exemplify the invention, it will be shown as it is embodied in a device to feed grain or other pelletized or granulated feed to poultry. For this purpose there is a hopper 5 in which the granular feed material 6 is stored in bulk and which feeds by gravity down to an outgoing supply trough 7. A feeder chain 8 in the outgoing trough 7 carries flights 9 which push the feed along the trough 7 in the direction of arrow 10.

Figure 2:
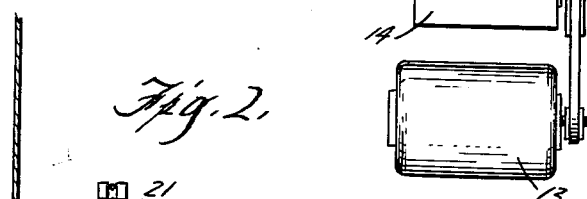
FIG. 2 is a cross section taken along the line 2—2 of FIG. 1.

In commercial embodiments of the invention the supply trough will make a circuit through the poultry house and will return to the vicinity of the hopper 5 in the form of an incoming trough 11 at a slightly higher level than the trough 7 and laterally offset therefrom, as is shown in FIGS. 1 and 2.

The chain 8 is continuous and receives power from a drive sprocket 12 driven by the motor 13 through a gear box 14 having an output shaft 15 connected to the sprocket 12.

Figure 3:
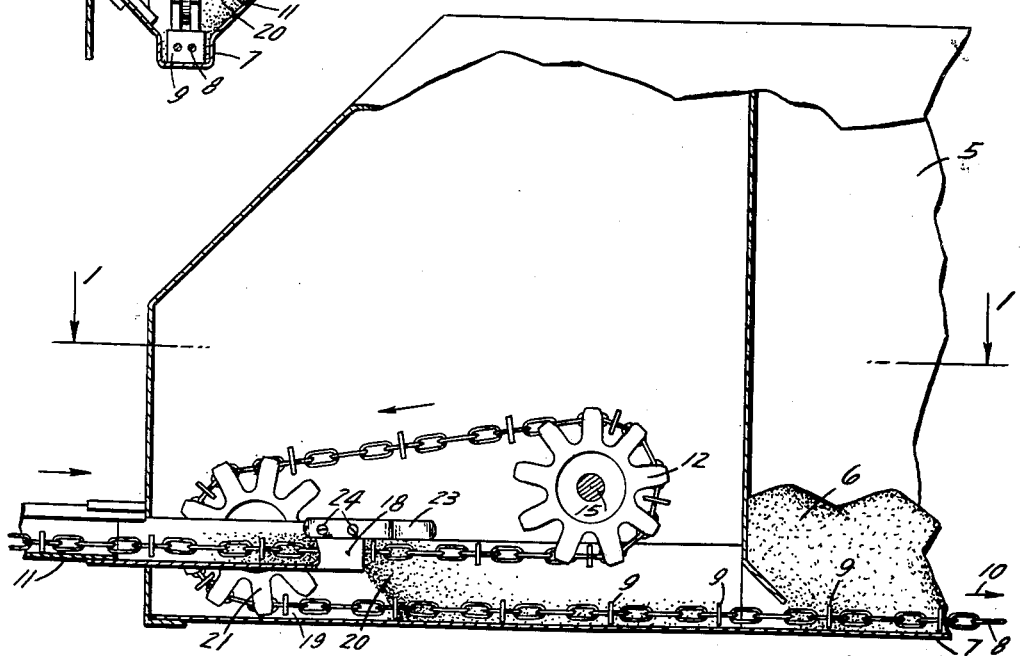
FIG. 3 is a vertical cross section taken through a device embodying the invention.

Drive sprocket 12 is aligned with trough 11 and is disposed beyond the discharge end 18 thereof so that any granular feed material which remains in the incoming trough 11 will be discharged downwardly and laterally by gravity into the input end 19 of the outgoing trough 7, as is shown at 20 in FIG. 3. Accordingly, the teeth of sprocket 12 are beyond the feed and are not subject to becoming fouled thereby.

The chain 8 which is wrapped around the sprocket 12 is also wrapped around idler sprocket 21 which is aligned with trough 7 and is laterally alongside the output end 18 of incoming trough 11 and axially offset from sprocket 12.

Accordingly, the chain 8 is trained to enter the input end of outgoing trough 7 and pick up feed 20 which is discharged from the output end 18 of incoming trough 11. Chain 8 is continuous, but because of the aforedescribed structure, the drive and idler sprockets will not be fouled with feed which might otherwise interfere with proper meshing of the sprocket teeth with the chain links.

By reason of the axial offset of sprockets 12, 21 and the lateral spacing of sprocket 21 from the incoming trough 11, sprocket 21 does not interfere with the relatively close spacing vertically between the input end 19 of the outgoing trough 7 and the discharge end 18 of the incoming trough 11. Accordingly, the disclosed structure is is characterized by relatively little difference in the levels of the respective troughs and the feed will not have far to fall in the course of its gravity transfer from the incoming trough to the outgoing trough.

The feed 20 will be deflected laterally and downwardly from one trough to the other by the inclined side 22 of the trough 7, as shown in FIG. 2. If the level of the feed in trough 11 extends above the chain flights 9, its lateral deflection is assisted by the deflector finger 23 which is fastened above the level of chain flights 9 by screws 24 or the like to the discharge end 18 of the incoming trough 11. Accordingly, the feed 20 is discharged both laterally and downwardly at a point which is between the axes of the two sprockets 12, 21.

As best shown in FIG. 1, the axle 25 on which sprocket 21 turns is canted slightly with respect to the turning axis of sprocket 12 for better meshing of the chain 8 with the teeth of sprocket 21.

I claim:

1. A chain feeder for granular material, including a chain, elongated substantially parallel incoming and outgoing troughs containing granular material fed by the chain, said outgoing trough having its input end at a lower level than the output end of the incoming trough for gravity discharge of granular material from the incoming trough into the outgoing trough, means for training the chain for travel through one trough and thence for travel through the other trough, said means including a first sprocket beyond the output end of the incoming trough and aligned therewith and around which the chain is wrapped, a second sprocket upstream of the input end of the outgoing trough and aligned therewith and around which the chain is wrapped, said outgoing trough being laterally offset from the incoming trough and said second sprocket being correspondingly axially offset from said first sprocket to accommodate said second sprocket alongside said incoming trough.

2. The device of claim 1 in combination with a deflector for deflecting laterally into the input end of the outgoing trough granular material discharged from the output end of the incoming trough.

3. The device of claim 2 in which said deflector is disposed beneath the output end of the incoming trough.

4. The device of claim 2 in which said deflector is above the level of the chain in the incoming trough, and means for mounting said deflector on the output end of the incoming trough.

5. A feeder for granular material and including a hopper, an elongated outgoing trough beneath the hopper, an elongated incoming trough which returns unused grain to the input end of the outgoing trough, a continuous chain trained through both of said troughs, the incoming trough being substantially parallel to the outgoing trough and at a higher level than the outgoing trough, whereby to discharge by gravity its contents into the outgoing trough, a drive unit comprising a drive sprocket about which said chain is wrapped and an idler sprocket about which said chain is wrapped in the course of training it from the incoming trough at one level to the outgoing trough at a lower level, said troughs being laterally offset and said sprockets being correspondingly axially offset whereby each sprocket is respectively aligned with a trough, one sprocket being beyond the output end of the incoming trough and the other sprocket being upstream of the input end of the outgoing trough.

References Cited in the file of this patent

UNITED STATES PATENTS

| | | |
|---|---|---|
| 1,093,815 | Whittier | Apr. 21, 1914 |
| 2,751,064 | Russell | June 19, 1956 |
| 2,754,801 | Reese | July 17, 1956 |
| 2,757,374 | Reed | July 31, 1956 |
| 2,934,199 | Winkler | Apr. 26, 1960 |

FOREIGN PATENTS

| | | |
|---|---|---|
| 238,369 | Great Britain | Aug. 20, 1925 |